(12) United States Patent
Koivisto et al.

(10) Patent No.: US 8,804,674 B2
(45) Date of Patent: Aug. 12, 2014

(54) STRUCTURE FOR OTA ENB-ENB COMMUNICATION

(75) Inventors: Tommi Koivisto, Espoo (FI); Jie Zhen Lin, Beijing (CN); Peter Skov, Beijing (CN); Chun Hai Yao, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 149 days.

(21) Appl. No.: 13/128,647

(22) PCT Filed: Nov. 12, 2008

(86) PCT No.: PCT/IB2008/054748
§ 371 (c)(1),
(2), (4) Date: Jun. 7, 2011

(87) PCT Pub. No.: WO2010/055367
PCT Pub. Date: May 20, 2010

(65) Prior Publication Data
US 2011/0243107 A1    Oct. 6, 2011

(51) Int. Cl.
*H04W 16/10* (2009.01)
*H04W 72/04* (2009.01)

(52) U.S. Cl.
USPC .......................................... 370/336; 370/329

(58) Field of Classification Search
USPC .................................. 370/336, 329
See application file for complete search history.

(56) References Cited

U.S. PATENT DOCUMENTS

| | | | |
|---|---|---|---|
| 2008/0137584 A1* | 6/2008 | Oh et al. | 370/315 |
| 2008/0279165 A1 | 11/2008 | Hu | 370/338 |
| 2010/0110964 A1* | 5/2010 | Love et al. | 370/312 |

FOREIGN PATENT DOCUMENTS

| | | |
|---|---|---|
| CN | 1382329 A | 11/2002 |
| CN | 1941665 A | 4/2007 |
| CN | 101257344 A | 9/2008 |
| EP | 1 850 543 A2 | 10/2007 |
| EP | 1 892 971 A1 | 2/2008 |
| EP | 1 892 973 A1 | 2/2008 |
| WO | WO 95/09497 | 4/1995 |

OTHER PUBLICATIONS

3GPP TS 36.421 V8.0.0 (Dec. 2007), "$3^{rd}$ Generation Partnership Project; Technical Specification Group Radio Access Network; Evolved Universal Terrestrial Access Network (E-UTRAN; X2 layer 1, (Release 8)", 6 pgs.

3GPP TS 36.211 V8.4.0 (Sep. 2008), "$3^{rd}$ Generation Partnership Project; Technical Specification Group Radio Access Network; Evolved Universal Terrestrial Access Network (E-UTRAN; Physical Channels and Modulation, (Release 8)", 78 pgs.

(Continued)

*Primary Examiner* — Huy D Vu
*Assistant Examiner* — Teisha D Hall
(74) *Attorney, Agent, or Firm* — Harrington & Smith

(57) ABSTRACT

According to one general aspect, an apparatus may include a processor. In various embodiments, the processor may be configured to select either an uplink sub-frame or a special sub-frame to employ for base station-to-base station (B2B) communication in some embodiments, the processor may be configured to cause at least one user equipment (UE), associated with the apparatus, to either refrain from transmitting or substantially receiving during the selected sub-frame In various embodiments, the processor may be configured to transmit data, from the apparatus to a receiving BS, during at least a portion of the selected sub-frame.

19 Claims, 10 Drawing Sheets

(56) References Cited

OTHER PUBLICATIONS

3GPP TS 36.411 V8.0.0 (Dec. 2007), "3$^{rd}$ Generation Partnership Project; Technical Specification Group Radio Access Network; Evolved Universal Terrestrial Access Network (E-UTRAN; S1 layer 1, (Release 8)", 7 pgs.

Bennis, M., et al., "Inter Base Station Resource Sharing and Improving the Overall Efficiency of B3G Systems", © 2007 IEEE, pp. 1494-1498.

* cited by examiner

200

900

STRUCTURE FOR OTA ENB-ENB COMMUNICATION

TECHNICAL FIELD

This description relates to communications, and more specifically to the over the air (OTA) communication between two or more evolved Node Bs (eNBs) or base stations (BSs).

BACKGROUND

Long Term Evolution (LTE) describes the latest standardization work by 3rd Generation Partnership Project (3GPP) in the area of mobile network technology in preparation for further increasing user demands and tougher competition from new radio access technologies, LTE is generally being enhanced with a new radio access technique called LTE-Advanced. Via this technology LTE is expected to improve end-user throughput, increase sector capacity, reduce user plane latency, and consequently offer superior user experience with full mobility.

The Evolved UMTS Terrestrial Radio Access (E-UTRA) standard typically includes the air interface of 3GPP's LTE for mobile networks. An E-UTRA network or, as it is occasionally referred to, a LTE network includes a network that is substantially in compliance with the LTE standards, their derivatives, or predecessors (hereafter, "the LTE standard" or "Release 8 standard"). 3rd Generation Partnership Project, *Technical Specification Group Radio Access Network; Evolved Universal Terrestrial Radio Access (E-UTRA); Physical Channels aid Modulation (Release 8)*, 3GPP TS 36.211 V8.4.0 (2008-09), September 2008.

SUMMARY

According to one general aspect, an apparatus may include a processor. In various embodiments, the processor may be configured to select either an uplink sub-frame or a special sub-frame to employ for base station-to-base station (B2B) communication. In some embodiments, the processor may be configured to cause at least one user equipment (UE), associated with the apparatus, to either refrain from transmitting or substantially receiving during the selected sub-frame. In various embodiments, the processor may be configured to transmit data, from the apparatus to a receiving BS, during at least a portion of the selected sub-frame.

According to another general aspect, a method of using a transmitting base station (BS) may include selecting either an uplink sub-frame or a special sub-frame to employ for base station-to-base station (B2B) communication, in some embodiments, the method may also include causing at least one user equipment (UE), associated with the transmitting BS, to either refrain from transmitting or substantially receiving during the selected sub-frame. In one embodiment, the method may include transmitting data, from the transmitting BS to a receiving BS, during at least a portion of the selected sub-frame.

According to another general aspect, an apparatus may include a means for selecting either an uplink sub-frame or a special sub-frame to employ for base station-to-base station (B2B) communication. In various embodiments, the apparatus may include a means for causing at least one user equipment (UE), associated with the transmitting BS, to either be communicatively muted or substantially communicatively deafened during the selected sub-frame. In some embodiments, the apparatus may include a means for transmitting data, from the transmitting BS to a receiving BS, during at least a portion of the selected sub-frame.

According to another general aspect, a machine readable medium may include instructions capable of being executed by at least one machine. In various embodiments, the instructions, when executed, cause the machine to select either an uplink sub-frame or a special sub-frame to employ for base station-to-base station communication. In some embodiments, the instructions may cause at least one user equipment, associated with the transmitting base station, to either refrain from transmitting or substantially receiving within the selected sub-frame. In various embodiments, the instructions may transmit data, from a transmitting base station to a receiving base station, during at least a portion of the selected sub-frame.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

DETAILED DESCRIPTION

Figure 1:
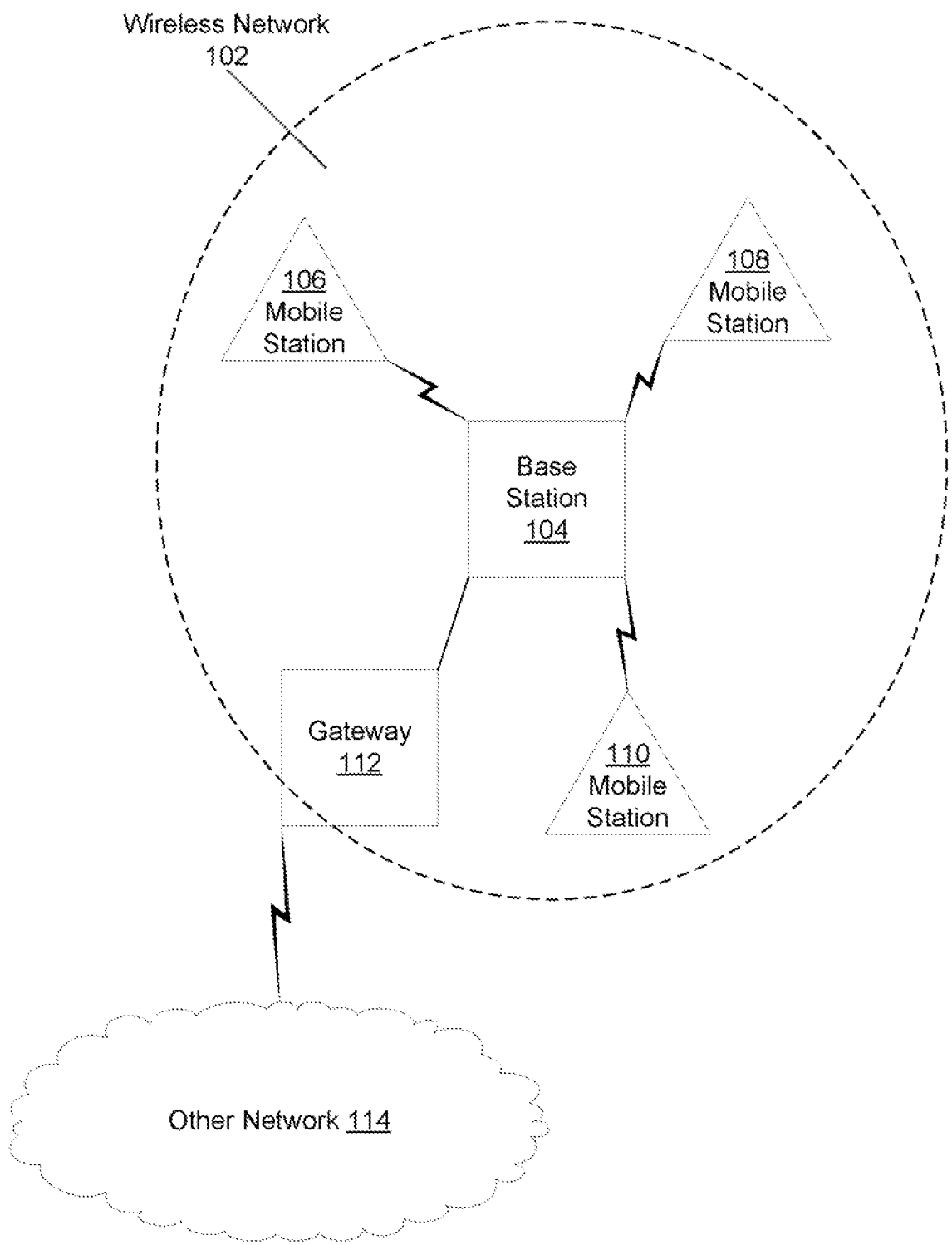
FIG. 1 is a block diagram of an example embodiment of a system in accordance with the disclosed subject matter.

Referring to the Figures in which like numerals indicate like elements. FIG. 1 is a block diagram of a wireless network 102 including an evolved Node Bs (eNBs) or base station (BS) 104 and user equipment (UE) or mobile stations (MSs) 106, 108, 110, according to an example embodiment. Each of the MSs 106, 108, 110 may be associated with BS 104, and may transmit data in an uplink (UL) direction to BS 104, and may receive data in a downlink (DL) direction from BS 104, for example. Although only one BS 104 and three mobile stations (MSs 106, 108 and 110) are shown, any number of base stations and mobile stations may be provided in network 102. Also, although not shown, mobile stations 106, 108 and 110 may be coupled to base station 104 via relay stations or relay nodes, for example. The base station 104 may be connected via wired or wireless links to another network (not shown), such as a Local Area Network (LAN), a Wide Area Network (WAN), the Internet, etc. In various embodiments, the base station 104 may be coupled or connected with the other network 120 via an access network controller (ASN) or gateway (GW) 112 that may control, monitor, or limit access to the other network.

Figure 2:
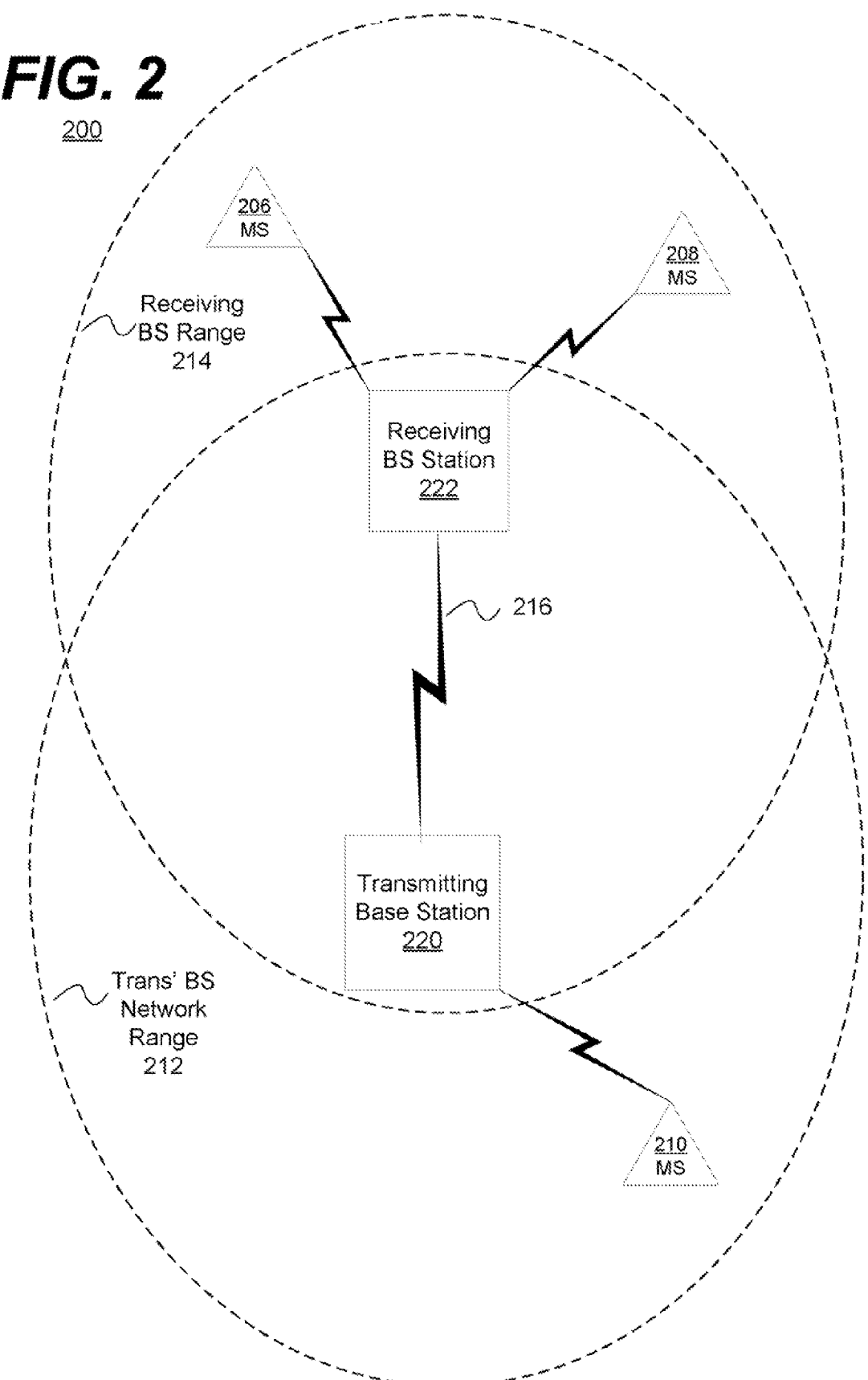
FIG. 2 is a block diagram of an example embodiment of a system in accordance with the disclosed subject matter.

FIG. 2 is a block diagram of an example embodiment of a system 200 in accordance with the disclosed subject matter. As described above, in various embodiments, the UEs or MSs may be in communication with their respective eNBs or BSs. In addition, the BSs may be communication with each other. In one embodiment, the system 200 may include a BS 220 in direct communication with a MS 210 and the BS 222. The BS 222 may be in direct communication with the MSs 206 and 206, and the BS 220. In various embodiments, the BS 220 may have a certain wireless range 212. Likewise the BS 222 may have a wireless range 214.

In various embodiments, it may be desirable for the BS 220 and the BS 222 to communicate with each other, BS-to-BS (B2B) communication, in various embodiments, this may be accomplished via out-of-band communication (e.g., via a gateway, etc.). In another embodiment, this communication may include an over the air (OTA) transmission between the two BSs 220 and 222 (illustrated by link 216). In such an embodiment, the B2B communication may include use of the same antennas, physical communication resources (e.g., sub-frames, etc.) used to communicate with the respective MSs (e.g. MSs 206, 208, and 210). In such an embodiment, time division duplexing (TDD) or time division multiplexing (TDM) DM) may be employed.

In various embodiments, an eNB or BS (e.g., BS 220 or BS 222) may not be capable of transmitting and receiving at the same time via the same radio resources. Therefore, in one embodiment, it may be required that the eNB or BS mutes or stop its transmission during OTA communication (OTAC) reception.

In various embodiments involving LTE, downlink transmission is often continuous in the downlink part of the radio frame. For example, some signals (e.g., reference signals, synchronization signals, Physical Downlink Control Channel and other control channels, etc.) may be substantially continuously transmitted. In various embodiments involving the Release 8 standard, UEs or MSs may expect that, for example, reference signals are always transmitted in downlink sub-frames, and that the UEs or MSs may perform channel estimation and power measurements using those reference signals. Thus if the eNB or BS for some reason is not transmitting the reference signals, a UE or MS may make incorrect channel estimation and mobility measurements.

In various embodiments, when OTA B2B communication is desired, the transmitting BS (illustrated as BS 220) may select a sub-frame to use to communication with the receiving BS (illustrated as BS 222) that will not result in a UE or MS (e.g., MS 210, etc) making incorrect channel estimation and mobility measurements, for example, in one embodiment, this may include selecting a non-DL sub-frame to employ or use to OTA B2B communication. In the illustrated embodiment, the BS 220 may be denoted as a transmitting BS, and the BS 222 as the receiving BS; it is understood that communication is not necessarily unidirectional and that these labels are merely for the sake of illustration. It is understood that bi-directional BS-to-BS (B2B) communication is included in the disclosed subject matter.

Figure 3:
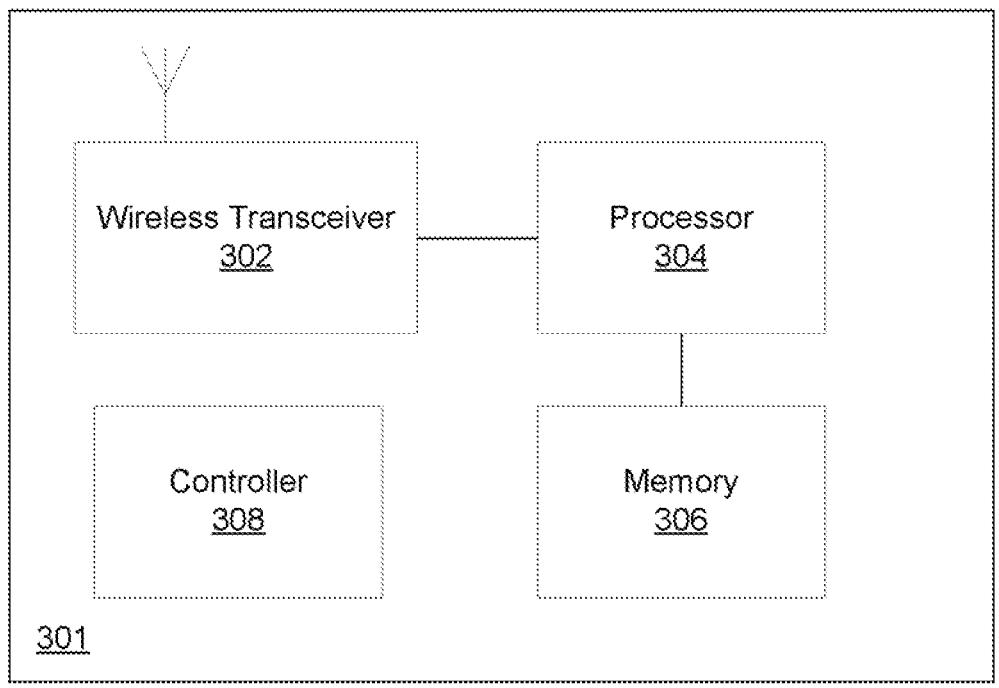
FIG. 3 is a block diagram of an example embodiment of an apparatus in accordance with the disclosed subject matter.

FIG. 3 is a block diagram of an example embodiment of a system or apparatus 301 in accordance with the disclosed subject matter. The apparatus or wireless station 301 (e.g., base station 104, mobile station 106, relay station, etc) may include, for example, an RF (radio frequency) or wireless transceiver 302, including a transmitter to transmit signals and a receiver to receive signals, a processor or baseband processor 304 to execute instructions or software and control transmission and receptions of signals, and a memory 306 to store data and/or instructions.

Processor 304 may also make decisions or determinations, generate frames or messages for transmission, decode received frames or messages for further processing, and other tasks or functions described herein. Processor 304, which may be a baseband processor, for example, may generate messages, packets, frames or other signals for transmission via wireless transceiver 302. Processor 304 may control transmission of signals or messages over a wireless network, and may receive signals or messages, etc., via a wireless network (e.g., after being down-converted by wireless transceiver 302, for example). Processor 304 may be programmable and capable of executing software, firmware, or other instructions stored in memory or on other computer media to perform the various tasks and functions described above, such as one or more of the tasks or methods described above. Processor 304 may be (or may include), for example, hardware, programmable logic, a programmable processor that executes software or firmware, and/or any combination of these. Using other terminology, processor 304 and transceiver 302 together may be considered as a wireless transmitter/receiver system, for example.

In addition, a controller (or processor) 308 may execute software and instructions, and may provide overall control for the station 301, and may provide control for other systems not shown in FIG. 3, such as controlling input/output devices (e.g., display, keypad), and/or may execute software for one or more applications that may be provided on wireless station 301, such as, for example, an email program, audio/video applications, a word processor, a Voice over IP application, or other application or software.

In addition, a storage medium may be provided that includes stored instructions, which when executed by a controller or processor may result in the processor 304, or other controller or processor, performing one or more of the functions or tasks described above.

Figure 4:
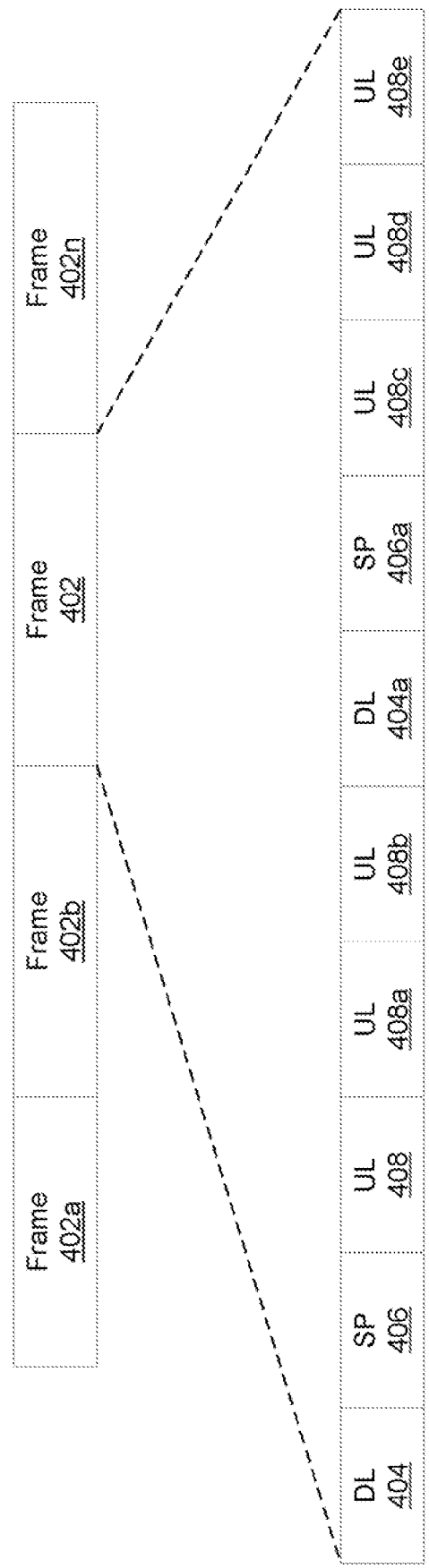
FIG. 4 is a block diagram of an example embodiment of a frame in accordance with the disclosed subject matter.

FIG. 4 is a block diagram of an example embodiment of a series of physical resource units (grouped as, for example, frames, super-frames, sub-frames, etc.) in accordance with the disclosed subject matter. In one embodiment, the eNB or base station and various UEs or mobile stations may communicate with each other using a series or plurality of physical resource units (PRUs) organized into frames 402 or super-frames 400; although, it is understood that various embodiments using other communication standards may organize PRUs differently.

FIG. 4 illustrates a plurality of frames. In various embodiments, the plurality of frames may be organized into a super-frame 400. In one embodiment, this super-frame 400 may include frames 402a, 402b, 402, and 402n. Frame 402 may include a down-link (DL) portion, an uplink (UL) portion and a special (SP) portion.

In various embodiments, a DL sub-frame 404 may be reserved for communication from the base station to a mobile station. Conversely, an UL sub-frame 408 may be reserved for communication from the mobile station to the base station. Downlink (DL) may refer to a direction of transmission from base station to a mobile station, and uplink (UL) may refer to a direction of transmission from a mobile station to a base station.

In various embodiments, a special (SP or S) sub-frame 406 may be used to transmit pilot information and provide a gap period, in which the BS may transition from transmitter to receiver (e.g., DL to UL), in some embodiments, the SP sub-frame 406 may include at least three fields: Downlink Pilot Timeslot (DwPTS), Guard Period (GP), and Uplink Pilot Timeslot (UpPTS), as described below.

In one embodiment, a frame 402 may include at least one DL sub-frame (e.g., DL sub-frames 404 and 404a, etc.), at least one SP or S sub-frame (e.g., SP sub-frames 406 and 406a, etc.) and at least one UL sub-frame (e.g., UL sub-frames 408, 408a, 408b, 408c, 408d, and 408e, etc.). In various embodiments, a SP or S sub-frame 406 and 406a may, respectively, delineate the transition between the DL and UL portions of the frame 402.

In various embodiments, a DL sub-frame 404 or UL sub-frame 408 may include messages or signals generally intended for a specific receiver or group of receivers. Occasionally these sub-frames may be used to broadcast control information (e.g., resource allocation, channel condition feedback, etc.), or more typically user data.

Figure 5:
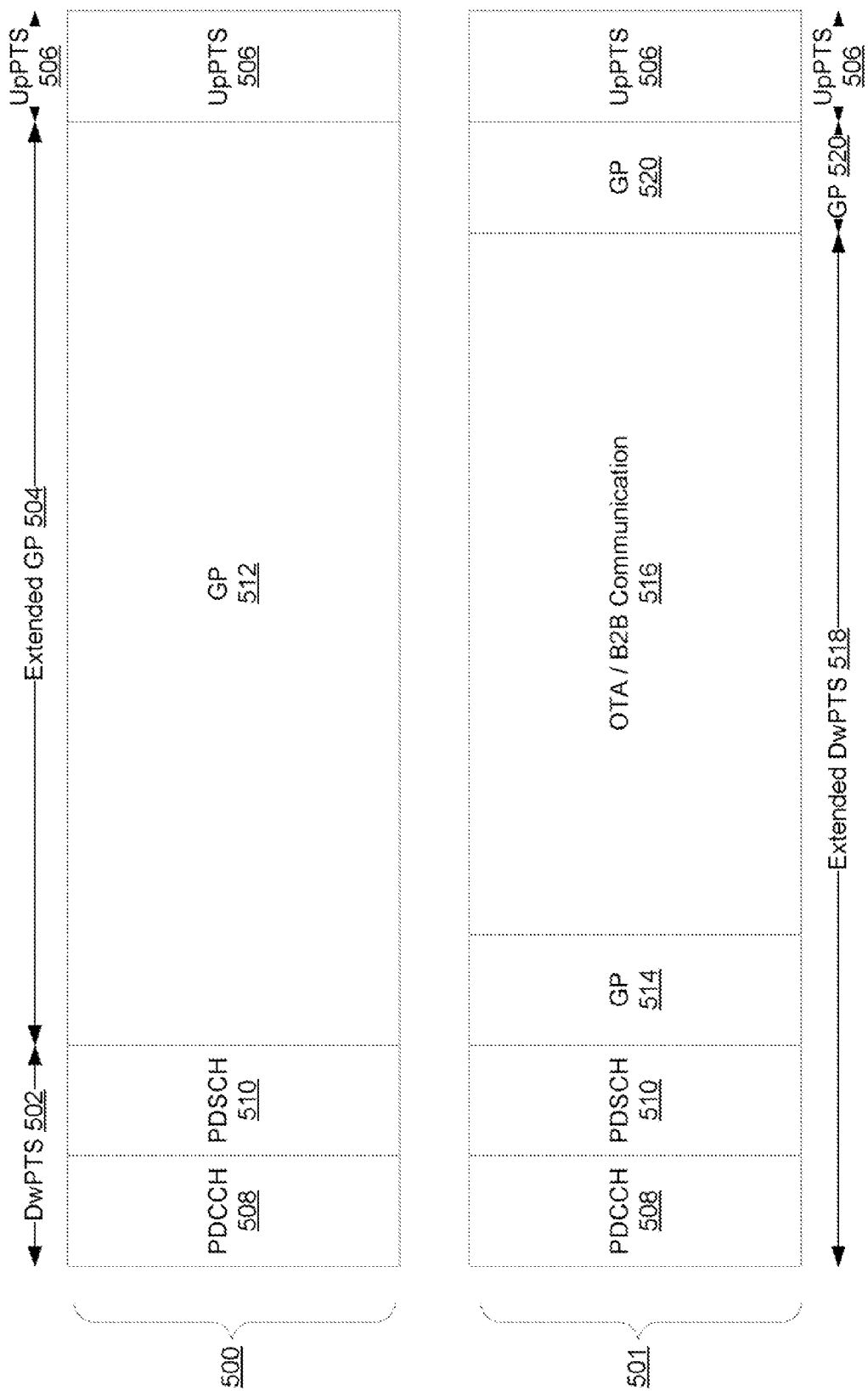
FIG. 5 is a block diagram of an example embodiment of a sub-frame in accordance with the disclosed subject matter.

FIG. 5 is a block diagram of an example embodiment of a special (S) sub-frame 500 in accordance with the disclosed subject matter. In one embodiment, a transmitting BS (e.g., BS 220 of FIG. 2) may use an S sub-frame to communicate with a receiving BS (e.g., BS 222 of FIG. 2). In one embodiment, the S sub-frame may include a Downlink Pilot Timeslot (DwPTS) 502, a Guard Period (GP) portion 504, and Uplink Pilot Timeslot (UpPTS) 506.

In various embodiments, the DwPTS 502 may include a Physical Downlink Control Channel (PDCCH) portion 508, and a Physical Downlink Shared Channel (PDSCH) portion 510. In some embodiments, the PDCCH 508 may include scheduling assignments and other control information. In various embodiments, the PDSCH 510 may include higher layer control information (e.g., system information, a synchronization signal, etc.) or user data.

In various embodiments, the GP 504 may include a period of time in which transmission and reception are muted or not scheduled to occur in various embodiments, such a time period may allow re-configuration of the antenna or transceiver of a device from receiver to a transmitter or vice versa. In various embodiments including loosely synchronized systems or asynchronous systems, the GP 504 may also account for transmission time between devices (e.g., eNB & UE, BS or MS, etc.).

In one example embodiment, a BS or eNB may select from a plurality of versions of the S sub-frame. In various embodiments, (e.g., the Release 8 standard) a special sub-frame configuration with a long or extended guard period (GP) may be signaled by the BS or eNB to the UEs or MSs. For example, such S sub-frame configurations may include configurations 0 or 5 as specified in Release 8 standard with a GP 504 of 10 or 9 symbols, respectively. See, 3rd Generation Partnership Project, *Technical Specification Group Radio Access Network; Evolved Universal Radio Access (E-UTRA); Physical Channels and Modulation* (*Release* 8), Table 4.2-1; Configuration of special subframe (lengths of DwPTS/GP/UPpTS), 3GPP TS 36.211 V8.4.0 (2008-09), September 2008. In various embodiments, the symbols may include orthogonal frequency-division multiplexing (OFDM) symbols.

In various embodiments, however, only a GP 504 of one or two symbols may be required in local area scenarios. In such an embodiment, some of the extra long or extended GP 504 may be now utilized for OTA B2B communication. For example, in one embodiment, if an S sub-frame configuration with a GP of 10 symbols, one or two symbols may be used to an actual GP, leaving 8 or 9 symbols available for OTA B2B communication. Although, it is understood that the above is merely one illustrative example to which the disclosed subject matter is not limited.

In various embodiments, a BS or eNB may signal to the MSs or UEs that an S sub-frame including an extended GP portion 504 is scheduled to occur (e.g., S sub-frame 500). In such an embodiment, the MSs or UEs may react as if the S sub-frame 500 is occurring. During the extended GP 504, the MSs or UEs may stop or refrain from their typical channel measurement, etc. and react as if they consider the BS or eNB transmissions to be muted or substantially silent. Likewise, the MSs and UEs may be configured to refrain from transmitting during this extended GP 504. However, in actuality, in one embodiment, the BS or eNB may employ the S sub-frame 501.

In one embodiment, the S sub-frame 501 may include an extended DwPTS portion 518. In various embodiments, the extended DwPTS portion 518 may include a PDCCH 508, a PDSCH 510, a first GP 514, an OTA B2B communication portion 516, and a second GP 520. In various embodiments, only one GP portion may be included. In such an embodiment, the eNB may transmit or receive data from a second eNB during the OTA B2B communication portion 516, without interfering with the MSs and UEs as those devices are ignoring the supposedly muted or silenced eNB (as they expect the eNB to be in the extended GP portion 504).

In various embodiments, the transmitting eNB or BS (e.g., BS 220), may use the last symbol or symbols of the extended DwPTS 518 or first OFDM symbols of the configured GP to transmit OTA B2B information (e.g., OTA B2B communication 516). In various embodiments, the number of symbols (e.g., OFDM symbols) available or employed to the OTA B2B (portion 516) may depend upon the signaled or indicated S sub-frame configurations and/or additional system information.

In various embodiments, the receiving eNB or BS (e.g., BS 222 of FIG. 2) may include the typical non-extended DwPTS portion 502 (e.g., PDCCH 508. PDSCH 510, etc) and switch to receiving OTA B2B communication mode right, after transmitting last symbol of the typical non-extended DwPTS. In such an embodiment, the first GP 514 may be used to transition to receiving mode. The OTA B2B communication from the transmitting BS or eNB (e.g., BS 220) may be received during the OTA B2B communication portion 516.

In various embodiments, the transmitting eNB or BS may insert a GP 514 before starting the OTA B2B transmission 516 to account for synchronization errors and transceiver re-configuration time (e.g., of the receiving eNB or BS, etc.). In another embodiment, a second GP 520 may be inserted after the OTA B2B transmission 516 to account to, once again account for synchronization errors and transceiver re-configuration time (e.g., of the transmitting eNB or BS, etc.) and to provide a substantially quite period for UEs or MSs to transmit their respective UpPTS 506 which may be timed (due to, for example, propagation delay, etc.) to arrive at the eNB or BS during the illustrated UpPTS 506 period.

In various embodiments, the first symbol of the OTA B2B communication 516 may include an extended or longer cyclic prefix (CP) acting as a GP (e.g., GP 514) or producing a substantially similar effect. In some embodiments, the cyclic prefix of a symbol (e.g., an OFDM symbol) may include a repeat of the end of the symbol at the beginning symbol. In various embodiments, an extended CP may include 16.67 μs or more; although, it is understood that the above is merely one illustrative example to which the disclosed subject matter is not limited. In some embodiments, the use of an extended CP as a GP, for example to allow for eNB or BS DL-UL switching, time, may be employed in a system in which the synchronization errors are small; although, it is understood that the above is merely one illustrative example to which the disclosed subject matter is not limited.

In another embodiment, one or more whole symbols may be used as the GP 514 or 520, as described above. Although, it is understood that the above is merely one illustrative example to which the disclosed subject matter is not limited.

In various embodiments, the transmitting eNB or BS (e.g., BS 220 of FIG. 2) may utilize the downlink transmission schemes (e.g., timing, encoding, etc.) for the OTA B2B communication 516. However, in other embodiments, the uplink transmission schemes may be utilized. In some embodiments, employing the uplink transmission schemes may be easier to implement since the eNB or BS receiver may be reused. In such an embodiment, neither the DL nor the UL schemes may be used for the OTA B2B communication 516. It is understood that the above are merely a few illustrative examples to which the disclosed subject matter is not limited.

Figure 6:
FIG. 6 is a block diagram of an example embodiment of a sub-frame in accordance with the disclosed subject matter.

FIG. 6 is a block diagram of an example embodiment of a sub-frame 601 in accordance with the disclosed subject matter. In one embodiment, the S sub-frame 601 may include a DwPTS portion 502, an extended GP 504, and an UpPTS 506. Sub-frame 601 illustrates that, in one embodiment, OTA B2B communication portion 516 may occur as part of the extended GP 504, as opposed to an extended DwPTS 518 of FIG. 5. In various embodiments, the resultant sub-frame may be substantially equivalent; however, the implementation and conceptual view of the sub-frame and the OTA B2B communication may differ. However, either conception, implementation or their substantial equivalents are within the scope of the disclosed subject matter.

Figure 10:
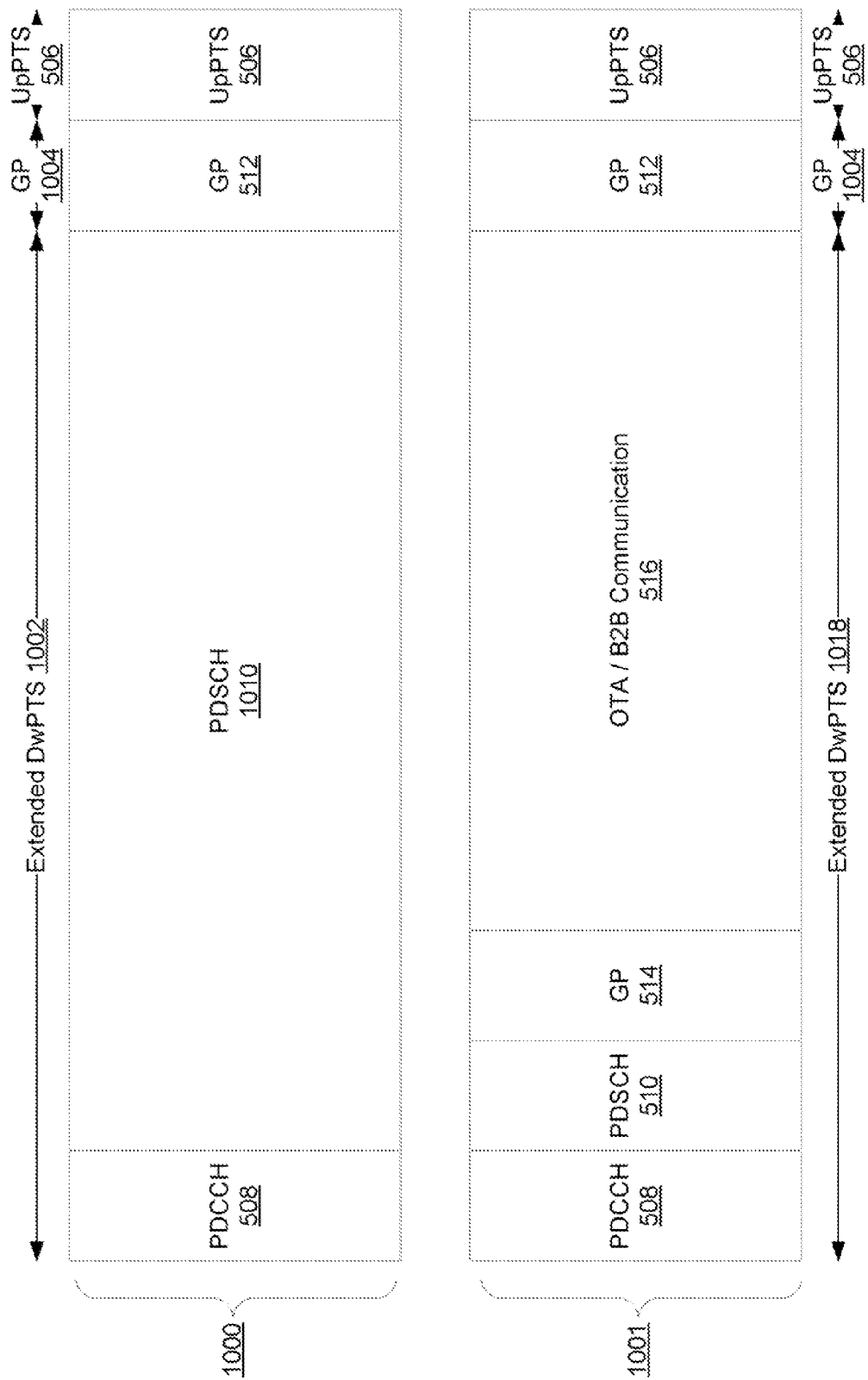
FIG. 10 is a block of an example embodiment of a sub-frame in accordance with the disclosed subject matter.

FIG. 10 is a block diagram of an example embodiment of a sub-frame 1001 in accordance with the disclosed subject matter. In one embodiment, the transmitting eNB or BS may indicate that an extended DwPTS period 1002 and a non-extended GP 1004 will occur, resulting in the sub-frame 1000. For example, such S sub-frame configurations may include configurations 4 or 8 as specified in Release 8 standard, as described above, having a GP 512 of 1 symbol. In such an embodiment, it may appear to the UEs or MSs as if the PDSCH 1010 is extended. However, in various embodiments, the eNB or BS may take or employ some symbols from this extended DwPTS 1002 for OTA B2B communication 516 and a GP 514, resulting in the actual sub-frame 1001. In various embodiments, the GP 514 of the extended DwPTS 1018 may be absent if an extended cyclic prefix is used for the first OTA B2B symbol, as described above.

Figure 8:
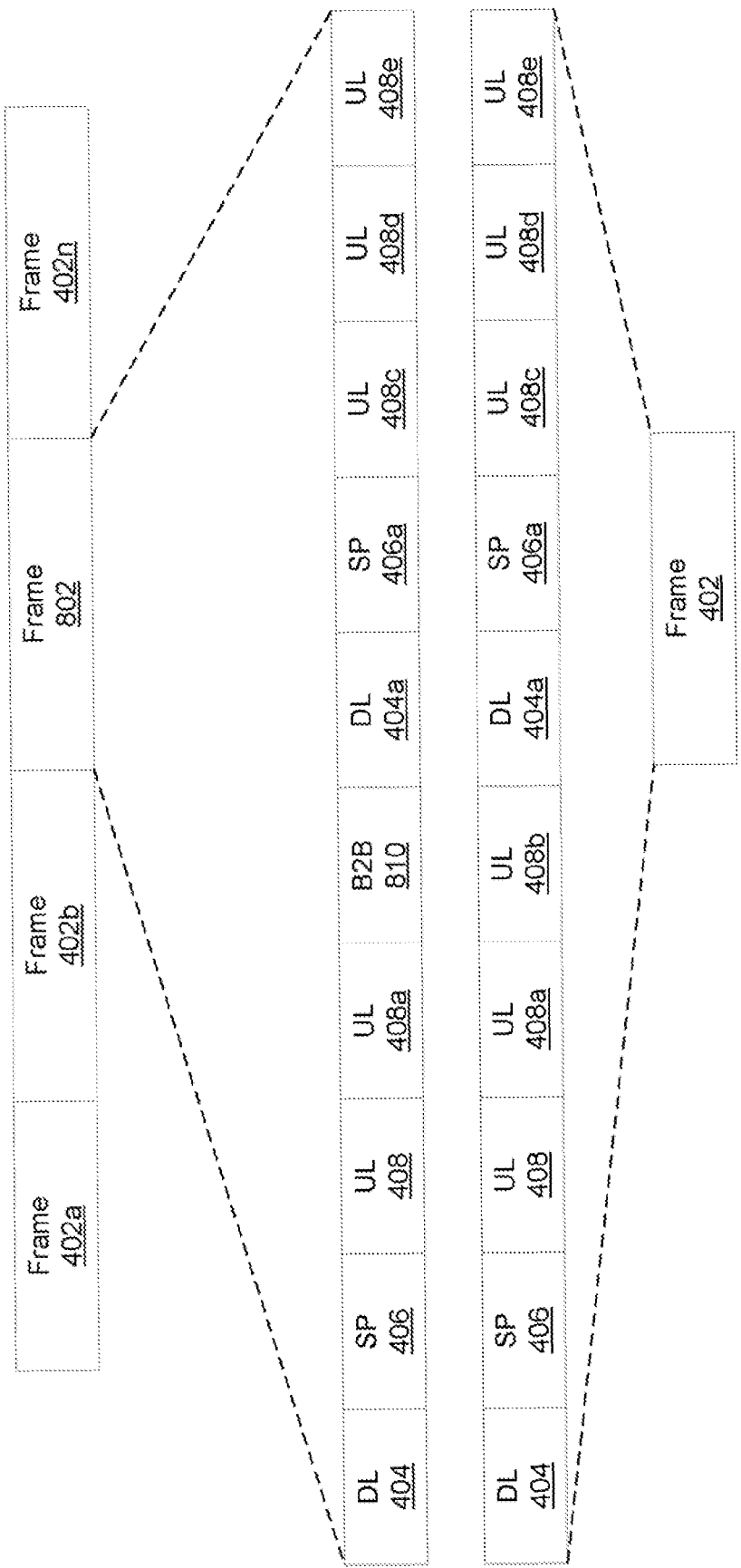
FIG. 8 is a block diagram of an example embodiment of a frame in accordance with the disclosed subject matter.

FIG. 8 is a block diagram of an example embodiment of a frame 802 in accordance with the disclosed subject matter. In another embodiment, the OTA B2B communication may occur during a presumptive UL sub-frame.

In various embodiments, the eNB or BS may indicate when DL, UL or S (SP) sub-frames may occur. In some embodiments, the eNB or BS may select a frame configuration from a list of possible frame configurations dictated by a standard (e.g., the Release 8 standard, etc.). One such configuration is illustrated in frame 402 (reproduced in FIG. 8 from FIG. 4).

Furthermore, in various embodiments, the eNB or BS allocates time and frequency segments (e.g., resource units, resource blocks, etc.) for communication with its respective UEs or MSs, as described above. Therefore, an eNB or BS may dictate when and from where a transmission will occur during any given UL sub-frame.

In various embodiments, the eNB or BS may select one or more UL sub-frames for OTA B2B communication. FIG. 8 illustrates once such configuration in which UL sub-frame 408*b* is selected as a B2B communication sub-frame 810. In various embodiments, this may occur by the eNB or BS selecting an uplink (UL) sub-frame to employ for B2B communication, and allocating the selected UL sub-frame to none of the UEs. In various embodiments, this may be referred to as the eNB or BS "stealing" a UL sub-frame for B2B communication. In various embodiments, the replacement of a UL sub-frame with a B2B sub-frame need not occur every frame, merely when needed or convenient for the eNB or BS.

As described above in FIGS. 5 and 6, in such an embodiment, the UEs and MSs need not be aware that a B2B communication is occurring. Furthermore, as with FIGS. 5 and 6, such an embodiment may be employed without a need to alter the set of possible frame configurations dictated by the networking standard used.

In such an embodiment, from the UEs or MSs point of view the B2B sub-frame 810 may appear to be a standard but unallocated UL sub-frame (e.g. UL sub-frame 408*b*). During such an unallocated UL sub-frame, the UEs or MSs may be, in one embodiment, muted or substantially silent as they refrain from transmission due to lack of allocation.

In such an embodiment, during the unallocated UL sub-frame (e.g., B2B sub-frame 810), the transmitting eNB or BS may switch from a receiving configuration to a transmitting configuration. The transmitting BS may then, in one embodiment, transmit OTA B2B information to a receiving BS (e.g., BS 222 of FIG. 2). In various embodiments, the entire or merely of a portion of the sub-frame may be used, depending on the amount of information to be transmitted. In various embodiments, the transmitting BS may then switch back from the transmitting configuration to a receiving configuration, depending upon whether or not the immediately subsequent sub-frame is a DL sub-frame or a UL sub-frame.

In some embodiments, a receiving eNB or BS may monitor or be aware of the transmitting BS's UL sub-frame allocations. In such an embodiment, when the transmitting eNB or BS does not allocate a UL sub-frame to any UEs or MSs, the receiving BS or eNB may expect a B2B communication to occur during that sub-frame. In some embodiments, the receiving BS may be incorrect and the sub-frame may merely be unallocated and not "stolen" for B2B purposes. In another embodiment, the transmitting eNB or BS may indicate (e.g., directly, indirectly via a gateway, indirectly via inference and/or assumption, etc.) to the receiving base station BS, which UL sub-frame (or more generally non-DL sub-frame; e.g., in the case of embodiments illustrated by FIGS. 5 and 6) has been selected for B2B communication. Although, it is understood that the above are merely a few illustrative examples to which the disclosed subject matter is not limited.

In various embodiments, an eNB or BS may select a particular UL sub-frame in order to minimize loss of system or device efficiency, in one embodiment, the eNB or BS may select the uplink (UL) sub-frame directly before a DL sub-frame to employ for B2B communication. In such an embodiment, this may mean that the eNB or BS need not switch its transceiver from a receiving configuration to a transmitting configuration more than it would had a non-B2B frame occurred. In such an embodiment, the eNB or BS would merely switch modes one sub-frame earlier than in the equivalent non-B2B frame (e.g., frame 802 versus frame 402).

In another embodiment, the B2B transmission period may be extended beyond one UL sub-frame (e.g., 2 UL sub-frames, etc.). In such an embodiment, a frame configuration (see FIG. 7) may be chosen that facilitates the selection of multiple UL sub-frames for use in B2B communication.

Figure 7:
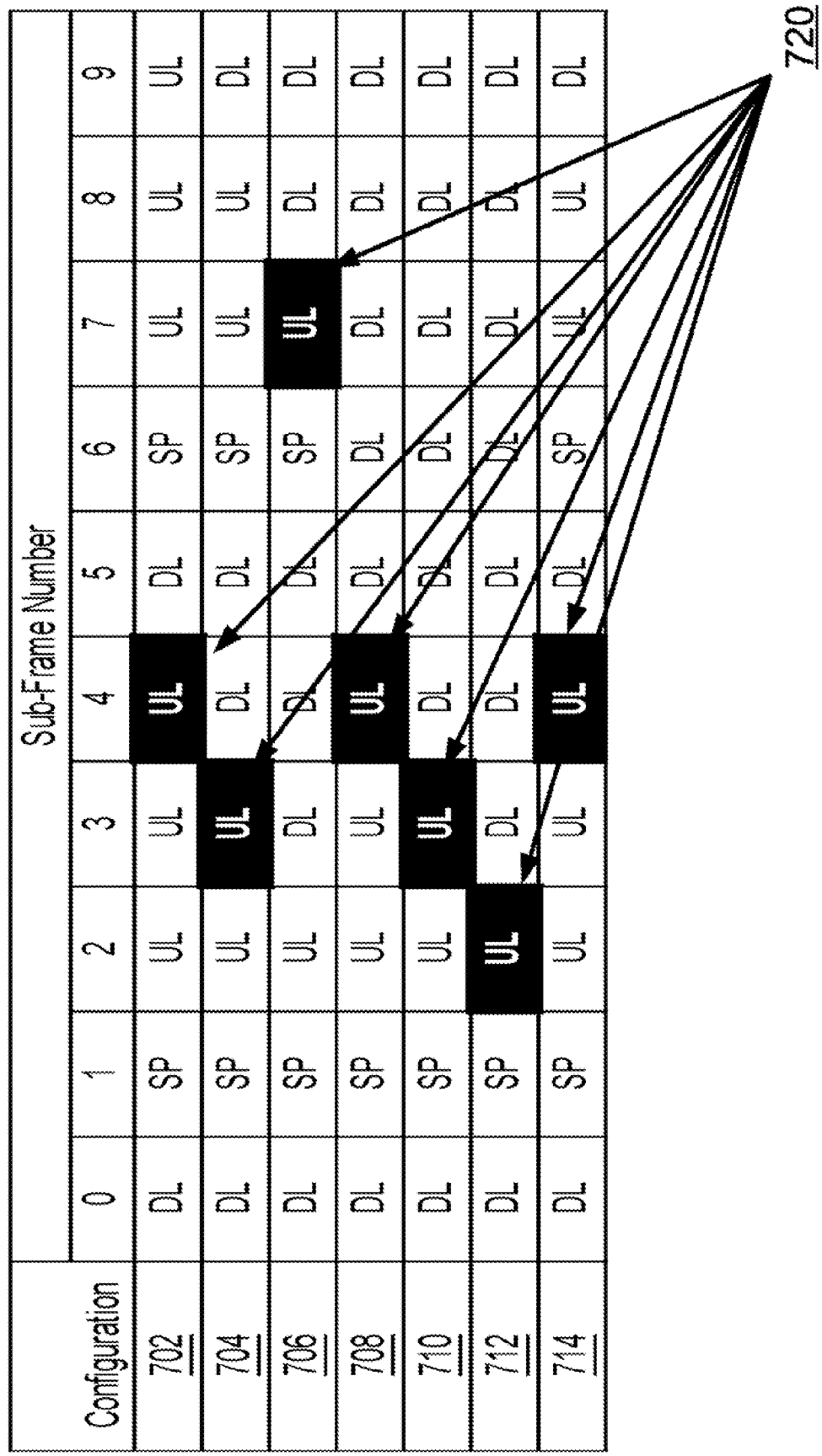
FIG. 7 is a table of example embodiments of a system in accordance with the disclosed subject matter.

FIG. 7 is a table 700 of example embodiments of a system in accordance with the disclosed subject matter. Table 700 illustrates a plurality of frame configurations that may be predefined by a standard (e.g., the Release 8 standard, etc.) or generally used in various embodiments, in various embodiments, the highlighted UL sub-frames 720 may be employed or "stolen" for B2B communication; although, it is understood that the above are merely a few illustrative examples to which the disclosed subject matter is not limited. For example, if configuration 702 is employed sub-frame 4 (a UL sub-frame) may be unallocated to any UEs or MSs and used instead for B2B communication.

In the illustrated embodiment, the last UL sub-frame directly before a DL sub-frame is employed for B2B communication it is understood that the illustrated is merely one example to which the disclosed subject matter is not limited and that sub-frames not directly before a DL sub-frame may be employed.

Figure 9:
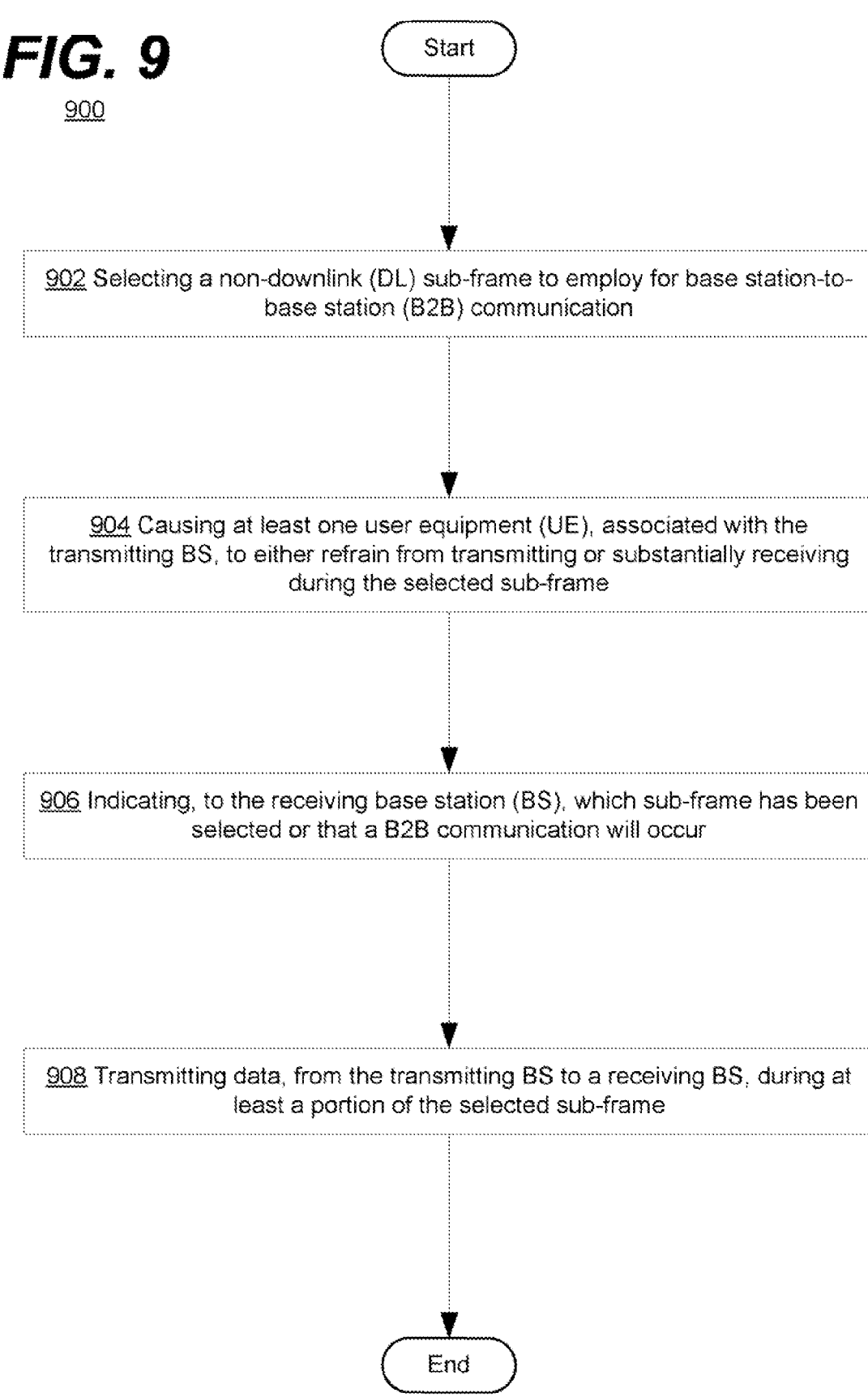
FIG. 9 is a flow chart of an example embodiment of a technique in accordance with the disclosed subject matter.

FIG. 9 is a flow chart of an example embodiment of a technique 900 in accordance with the disclosed subject matter. In various embodiments, the technique 900 may be performed by the system of FIG. 1 or 2, the apparatus of FIG. 3, as described above. In some embodiments, the technique 900 may be used with a sub-frame as illustrated by FIGS. 5 and/or 6, as described above. In some embodiments, the technique 900 may be used with a frame as illustrated by FIGS. 7 and/or 8, as described above.

Block 902 illustrates that, in one embodiment, a non-downlink (DL) sub-frame may be selected by an eNB or BS to be employed for base station-to-base station (B2B) communication, as described above. In one embodiment, selecting ma include indicating to at least one UE that a sub-frame including an extended guard period (GP) will occur, as described above in such an embodiment, the selected sub-frame may include a downlink pilot time slot (DwPTS) portion, and a GP portion, and the extended GP portion may include at least one GP, and a B2B communication portion, as described above, in one embodiment, the selected sub-frame may include an extended downlink pilot time slot (DwPTS) portion, and a GP portion, and the extended DwPTS portion may include a non-extended DwPTS portion, at least one GP, and a B2B communication portion, as described above. In various embodiments, the action(s) illustrated by this block may be performed by various elements, such as the BS 104 of FIG. 1, the BS 220 of FIG. 2, the apparatus 301, and/or the processor 304 of FIG. 3, as described above.

In another embodiment, selecting may include selecting an uplink (UL) sub-frame to employ for B2B communication, and allocating the selected UL sub-frame to none of the UEs or MSs, as described above. In some embodiments, allocating may include causing the receiving BS to expect a B2B communication, as described above. In one embodiment, selecting may include selecting an uplink (UL) sub-frame directly before a sub-frame to employ for B2B communication, as described above. In various embodiments, the action(s) illustrated by this block may be performed by various elements, such as the BS 104 of FIG. 1, the BS 220 of FIG. 2, the apparatus 301, and/or the processor 304 of FIG. 3, as described above.

Block 904 illustrates that, in one embodiment, the eNB or BS may cause at least one user equipment (UE) or MS, associated with the eNB or BS, to either refrain from transmitting or substantially receiving during the selected in-band non-downlink sub-frame, as described above. In one embodiment, causing or refraining from substantially receiving (e.g., performing channel measurements, etc.) may include indicating to the UEs or MSs that a guard period (GP) will occur when in actually a B2B communication will occur, as described above, in another embodiment, causing or refraining from transmitting may include not allocating a selected UL sub-frame to any of the UEs or MSs, as described above. In various embodiments, the action(s) illustrated by this block may be performed by various elements, such as the BS 104 of FIG. 1, the BS 220 of FIG. 2, the apparatus 301, and/or the processor 304 and/or transceiver 302 of FIG. 3, as described above.

Block 906 illustrates that, in one embodiment, the eNB or BS may indicate, to the receiving base station (BS), which non-downlink sub-frame has been selected or that a B2B communication will occur, as described above. In one embodiment, indicating may include causing the receiving BS to expect a B2B communication due to no UL allocations to a UE or MS occurring during a UL sub-frame, as described above. In various embodiments, the slots or sub-frames for B2B communication may be configured beforehand via wired interface, in one embodiment, In another embodiment, the slots or sub-frames may be configured during base station start-up by listening to the broadcast information of other base stations before starting normal operation. In such an embodiment, this broadcast information may include indications about which slots or sub-frames are used for B2B communication. In other embodiments, indicating may include a message (e.g., direct, indirect via a third device, indirect via inference, etc.), as described above. In various embodiments, the action(s) illustrated by this block may be performed by various elements, such as the BS 104 of FIG. 1, the BS 220 of FIG. 2, the apparatus 301, and/or the processor 304 and/or transceiver 302 of FIG. 3, as described above.

Block 908 illustrates that, in one embodiment, the eNB or BS may transmit data, from the transmitting BS to a receiving BS, during at least a portion of the selected in-band non-downlink sub-frame, as described above. In one embodiment, transmitting may include during at least a portion of the extended GP, transmitting data to the receiving BS, as described above. In another embodiment, transmitting may include during at least a portion of the selected UL sub-frame, transmitting data to the receiving BS, as described above. In various embodiments, the action(s) illustrated by this block may be performed by various elements, such as the BS 104 of FIG. 1, the BS 220 of 2, the apparatus 301, and/or the processor 304 and/or transceiver 302 of FIG. 3, as described above.

In various embodiments, the transmitting eNB or BS and the receiving eNB or BS may be configured to operate substantially asynchronously. In another embodiment, the transmitting eNB or BS and the receiving eNB or BS may be configured to operate loosely synchronously, as described above. In yet another embodiment, the eNBs or BSs may be strictly synchronized.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks, information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising: one or more processors; and one or more memories including computer program code; the one or more memories and the computer program code being configured, with the one or more processors, to cause the apparatus to perform at least the following:
    indicate to at least one user equipment, associated with the apparatus, that a sub-frame including either an extended guard period or an extended downlink pilot time slot portion will occur;
    cause the at least one user equipment, to refrain from either transmitting or substantially receiving within the sub-frame; and
    within at least a portion of either the extended guard period or the extended downlink pilot time slot, transmit data to a receiving base station.

2. The apparatus of claim 1, wherein the processor is configured to:
    indicate, to the receiving base station, which sub-frame has been selected.

3. The apparatus of claim 1, wherein the processor is configured to:
    indicate, to the receiving base station, that a base station-to-base station communication will occur during the extended guard period.

4. The apparatus of claim 1, wherein the sub-frame includes:
    a downlink pilot time slot portion, and an extended guard period portion; and
wherein the extended guard period portion includes:
    at least one non-extended guard period portion, and a base station-to-base station communication portion.

5. The apparatus of claim 1, wherein the sub-frame includes:
    an extended downlink pilot time slot portion, and a guard period portion; and
wherein the extended downlink pilot time slot portion includes:
    a non-extended downlink pilot time slot portion and a base station-to-base station communication portion.

6. The apparatus of claim 1, wherein the processor is configured to:
    select an uplink sub-frame to employ for base station-to-base station communication; and
    allocate the selected uplink sub-frame to none of the user equipment.

7. The apparatus of claim 1, wherein the processor is configured to:
    select an uplink sub-frame directly before a downlink sub-frame to employ for base station-to-base station communication.

8. The apparatus of claim 1, wherein the processor is configured to:
    cause the receiving base station to expect a base station-to-base station communication.

9. A method comprising:
    indicating to at least one user equipment that a sub-frame including either an extended guard period or an extended downlink pilot time slot portion will occur;
    causing the at least one user equipment, associated with a transmitting base station, to refrain from either transmitting or substantially receiving within the sub-frame; and
    within at least a portion of either the extended guard period or the extended downlink pilot time slot, transmitting data from the transmitting base station to a receiving base station.

10. The method of claim 9 further including:
    indicating, to the receiving base station, which sub-frame has been selected.

11. The method of claim 10 further including:
    indicating, to the receiving base station, that a base station-to-base station communication will occur during the extended guard period.

12. The method of claim 10 wherein the selected sub-frame includes:
    an extended downlink pilot time slot portion, and a guard period portion; and
wherein the extended downlink pilot time slot portion includes:
    a non-extended downlink pilot time slot portion and a base station-to-base station communication portion.

13. The method of claim 10, wherein the selected sub-frame includes:
    a downlink pilot time slot portion, and an extended guard period portion; and
wherein the extended guard period portion includes:
    at least one non-extended guard period portion, and a base station-to-base station communication portion.

14. The method of claim 9 further comprising:
    selecting an uplink sub-frame to employ for base station-to-base station communication; and
    allocating the selected uplink sub-frame to none of the user equipment.

15. The method of claim 9 further comprising
    selecting an uplink sub-frame directly before a downlink sub-frame to employ for base station-to-base station communication.

16. The method of claim 14 further comprising:
causing the receiving base station to expect a base station-to-base station communication.

17. An apparatus comprising:
a means for indicating to at least one user equipment, associated with the apparatus, that a sub-frame including either an extended guard period or an extended downlink pilot time slot portion will occur;
a means for causing the at least one user equipment to refrain from either transmitting or substantially receiving within the selected sub-frame; and
a means for transmitting data from a transmitting base station to a receiving base station within at least a portion of either the extended guard period or the extended downlink pilot time slot.

18. The apparatus of claim 17 further comprising:
a means for selecting an uplink sub-frame to employ for base station-to-base station communication; and
wherein the means for causing includes:
a means for allocating the selected uplink sub-frame to none of the user equipment.

19. A non-transitory machine readable storage medium comprising instructions capable of being executed by at least one machine, wherein the instructions, when executed, cause the machine to:
indicate to at least one user equipment, associated with the machine, that a sub-frame including either an extended guard period or an extended downlink pilot time slot portion will occur;
cause at least one user equipment to refrain from either transmitting or substantially receiving within the selected sub-frame; and
within at least a portion of either the extended guard period or the extended downlink pilot time slot, transmit data from a transmitting base station to a receiving base station.

* * * * *